(12) United States Patent
Voruganti et al.

(10) Patent No.: US 8,879,393 B2
(45) Date of Patent: *Nov. 4, 2014

(54) QUALITY OF SERVICE (QOS) CONFIGURATION FOR NETWORK DEVICES WITH MULTIPLE QUEUES

(75) Inventors: Sreenivas Voruganti, Bangalore (IN); Ashish Pal, New Delhi (IN); Balaji Murali, Bangalore (IN); Shankar Ramanathan, Bangalore (IN); Rahul Jain, Bangalore (IN)

(73) Assignee: Juniper Networks, Inc., Sunnyvale, CA (US)

( * ) Notice: Subject to any disclaimer, the term of this patent is extended or adjusted under 35 U.S.C. 154(b) by 293 days.

This patent is subject to a terminal disclaimer.

(21) Appl. No.: 13/485,363

(22) Filed: May 31, 2012

(65) Prior Publication Data

US 2012/0243412 A1     Sep. 27, 2012

Related U.S. Application Data

(63) Continuation of application No. 12/537,525, filed on Aug. 7, 2009, now Pat. No. 8,213,453.

(51) Int. Cl.
*G01R 31/08* (2006.01)
*H04L 12/54* (2013.01)
*H04L 12/823* (2013.01)
*H04L 12/835* (2013.01)

(52) U.S. Cl.
CPC ............... *H04L 47/30* (2013.01); *H04L 47/32* (2013.01)
USPC .......................... 370/235; 370/252; 370/429

(58) Field of Classification Search
None
See application file for complete search history.

(56) References Cited

U.S. PATENT DOCUMENTS

| 8,213,453 | B1 * | 7/2012 | Voruganti et al. ............ 370/444 |
| 2003/0225737 | A1 * | 12/2003 | Mathews ........................ 707/1 |
| 2005/0063392 | A1 | 3/2005 | Ofuji et al. |
| 2006/0150191 | A1 | 7/2006 | Masuda et al. |
| 2007/0064731 | A1 * | 3/2007 | Mizutani et al. ............. 370/468 |
| 2007/0105563 | A1 | 5/2007 | Ro et al. |
| 2010/0067535 | A1 | 3/2010 | Ma et al. |
| 2010/0095017 | A1 | 4/2010 | Ghetie et al. |
| 2010/0195503 | A1 | 8/2010 | Raleigh |

OTHER PUBLICATIONS

Co-pending U.S. Appl. No. 12/537,525, entitled "Quality of Service (QOS) Configuration for Network Devices with Multiple Queues," filed Aug. 7, 2009 (35 pages).

* cited by examiner

*Primary Examiner* — Jutai Kao
(74) *Attorney, Agent, or Firm* — Harrity & Harrity, LLP

(57) ABSTRACT

A network device implements automatic configuration of Quality of Service (QoS) parameters in response to operator specification of a relatively few and easily understandable "high level" parameters such as, for example, latency requirements or an acceptable rate of packet drops. In one implementation, a network device may receive user preference information that relates to a Quality of Service (QoS) for network traffic passing through the network device and may measure traffic patterns through the network device. The device further generates a configuration template based on the measured traffic patterns and on the user preference information transmit the data in an order of transmission that is prioritized according to a bandwidth allocation policy defined by the configuration template.

20 Claims, 6 Drawing Sheets

QUALITY OF SERVICE (QOS) CONFIGURATION FOR NETWORK DEVICES WITH MULTIPLE QUEUES

RELATED APPLICATION

This application is a continuation of U.S. patent application Ser. No. 12/537,525, filed Aug. 7, 2009, which is incorporated herein by reference.

BACKGROUND

In an increasingly networked world, more and more traffic, such as data, voice, and video, is transmitted over public and proprietary networks. When routing traffic through the network, it is desirable to be able to assign different types of traffic different priorities as the traffic traverses the network. Some applications require stringent limits on end-to-end traffic delay while other applications require minimal bandwidth guarantees. For example, because streaming video and voice data, when it is delayed, can result in a noticeable degradation in quality to the end-user, it may be desirable to assign this type of traffic a higher priority than other traffic.

In Internet Protocol (IP) packet-based networks, network devices such as routers and switches may handle the transmission of the packets through the network. Packets belonging to different traffic classes may be given different priorities by the routers/switches. The routers/switches may allocate network resources (such as bandwidth) to the traffic classes based on predetermined bandwidth allocation policies. For example, within the router/switch, packets of different traffic classes that are routed to the same output port may share the link resources of the output port. When the incoming traffic data rate exceeds the output port link capacity, the packets may be buffered and the bandwidth allocation policies applied.

Currently, the bandwidth allocation policies for a router/switch may be performed by an operator that sets or fine tunes a number of parameters. For example, the operator may need to define and fine-tune a number of class of service (CoS) attributes, buffer parameters, or scheduler configurations, such as classifiers, rewrites, forwarding classes, and schedulers/scheduler-maps, and then apply these policies to the ports of the router/switch. Many of these parameters that are set or fine-tuned by the operator are parameters that are relatively esoteric and difficult for someone without a lot of training to understand.

SUMMARY

In one aspect, a network device may include logic to receive user preference information that relates to a Quality of Service (QoS) for network traffic passing through the network device; logic to measure traffic patterns through the network device; logic to generate a configuration template based on the measured traffic patterns and on the user preference information; logic to receive data from a first physical link; logic to process the data to determine destination information for the data; and logic to transmit the data on a second physical link in accordance with the destination information, an order of transmission of the data being prioritized according to a bandwidth allocation policy defined by the configuration template.

In another aspect, a method may include receiving user preference information that relates to a QoS for network traffic passing through a plurality of queues within the network device; measuring traffic patterns through the network device by measuring usage parameters for the plurality of queues by isolating each of the plurality of queues before measuring the usage parameters for the isolated queue; configuring bandwidth allocation policies based on the measured traffic patterns and on the user preference information; and routing traffic through the network device based on the configured bandwidth allocation policies.

In yet another aspect, a network device may include logic to receive user preference information that relates to a QoS for network traffic passing through the network device, where the user preference information is defined by directly observable parameters that relate to QoS for the network traffic processed by the network device; logic to measure traffic patterns through the network device; logic to configure bandwidth allocation policies based on the measured traffic patterns and on the user preference information; and logic to route traffic through the network device based on the configured bandwidth allocation policies.

BRIEF DESCRIPTION OF THE DRAWINGS

The accompanying drawings, which are incorporated in and constitute a part of this specification, illustrate one or more embodiments of the invention and, together with the description, explain the invention. In the drawings.

DETAILED DESCRIPTION

The following detailed description of the invention refers to the accompanying drawings. The same reference numbers in different drawings may identify the same or similar elements. Also, the following detailed description does not limit the invention.

As described herein, a network device may implement automatic configuration of Quality of Service (QoS) parameters. The automatic configuration may be performed in response to operator specification of a relatively few and easily understandable "high level" parameters such as latency requirements or an acceptable rate of packet drops.

Exemplary System Overview

Figure 1:
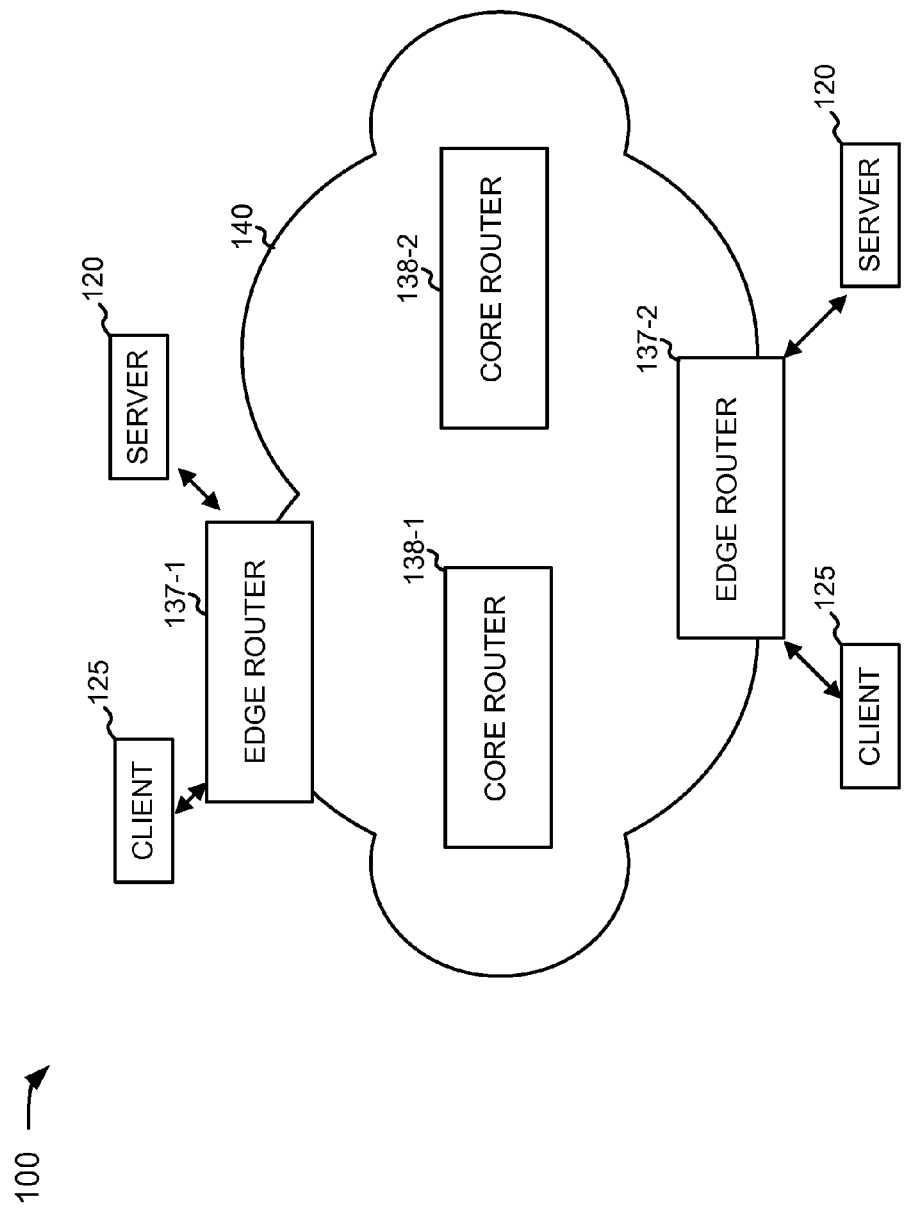
FIG. 1 is a diagram of an exemplary system in which concepts described herein may be implemented.

FIG. 1 is a diagram of an exemplary system 100 in which concepts described herein may be implemented. System 100 may include multiple entities, such as one or more servers 120 and one or more clients 125. Servers 120 may include one or more computing devices designed to provide information or to otherwise interact with clients 125. Similarly, clients 125 may each include one or more computing devices designed to interact with and obtain content from servers 120 or with other clients 125.

Clients 125 and servers 120 may communicate via a network 140. Network 140 may include a wide area network (WAN), such as the Internet, a private WAN, or a combination of the Internet and a private WAN, that is used to transport data to servers 120 and clients 125.

Network 140 may include a number of network devices, such as edge routers 137-1 and 137-2, and core routers 138-1 and 138-2. Edge routers 137 may generally function to connect devices, such as clients 125 or servers 120 to network 140. Core routers 138 may function to transmit data between other routers within network 140. In addition to simply routing data, edge routers 137 and core routers 138 may support other "value added" functions, such as quality of service (QoS) features and specialized security functions, such as IPsec (IP security) encryption. In these situations one or more of core routers 138 and/or edge routers 137 may be configured to satisfy a traffic contract in which a minimum QoS is guaranteed for packets within a specified flow or stream.

One of ordinary skill in the art will appreciate that, in practice, system 100 may include other network devices. Additionally, although network 140 is primarily described herein as an IP-based network, network 140 could also be an ATM-based network, a frame relay-based network, or a combination of such networks.

Figure 2:
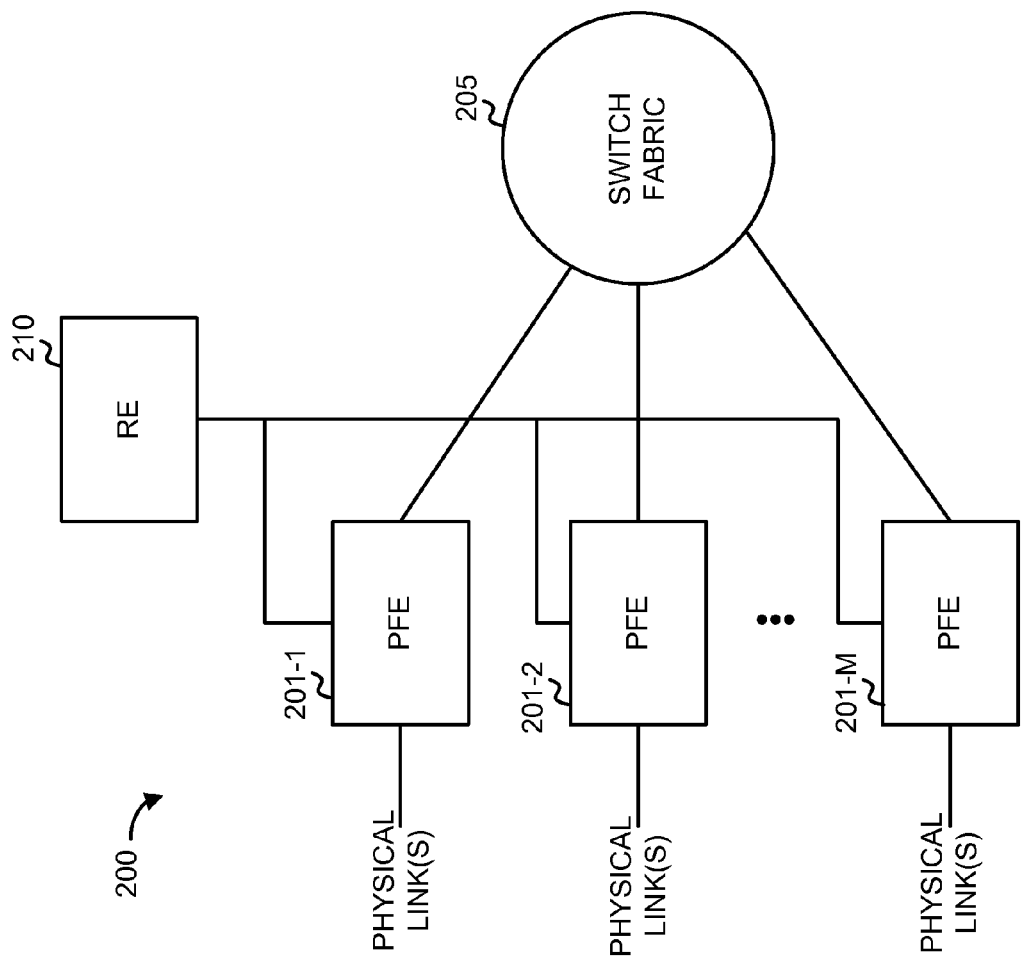
FIG. 2 is a block diagram illustrating a high-level exemplary implementation of one of the network devices shown in FIG. 1.

FIG. 2 is a block diagram illustrating a high-level exemplary implementation of one of edge routers 137 or core routers 138, referred to as network device 200 herein. Network device 200 may include packet forwarding engines (PFEs) 201-1 through 201-M (collectively referred to as PFEs 201), an internal switch fabric 205, and a routing engine (RE) 210. Network device 200 may receive data from physical links, process the data to determine destination information, and transmit the data out on a link in accordance with the destination information.

RE 210 may perform high level management functions for network device 200. For example, RE 210 may communicate with other networks and systems connected to network device 200 to exchange information regarding network topology. RE 210 may create routing tables based on the network topology information and forward the routing tables to PFEs 201. PFEs 201 use the routing tables to perform route lookup for incoming data. RE 210 may also perform other general control and monitoring functions for network device 200.

PFEs 201 may each connect to each other via switch fabric 205. Switch fabric 205 provides internal links between different PFEs 201. In general, PFEs 201 receive data on ports connecting physical links that lead to network 140. Each physical link could be one of many types of transport media, such as optical fiber or Ethernet cable. The data on the physical link may be formatted according to one of several protocols, such as the synchronous optical network (SONET) standard. PFEs 201 may process the received data, determine the correct output port for the data, and transmit the data on the physical link corresponding to the determined output port.

Although network device 200 is described above as an edge router 137 or core router 138, it can be appreciated that in alternative implementations, network device 200 may generally be implemented as a router or switch that performs other functions in network 140. Network device 200 may also potentially be implemented as a device installed locally at a location of client 125 or server 120.

Packets traversing a network, such as network 140, may be assigned to various priority classes (also called traffic classes or Class of Service (CoS) classes herein) and then allocated bandwidth differently based on the priority classes. For IP packets, the IP header portion of the packet is frequently set to indicate the priority level of the packet. Network device 200 may analyze the IP header portion of the packet to determine the CoS for a packet. For example, the header of a packet may contain a Type of Service (TOS) field that includes bits that may be based on the priority level of the packet.

Bandwidth Allocation

Aspects described herein provide for flexible allocation of bandwidth in a router or switch. An administrator of the router or switch, by setting a relatively few number of parameters, can exercise control of relative priority policies of the bandwidth allocation at the network device.

Figure 3:
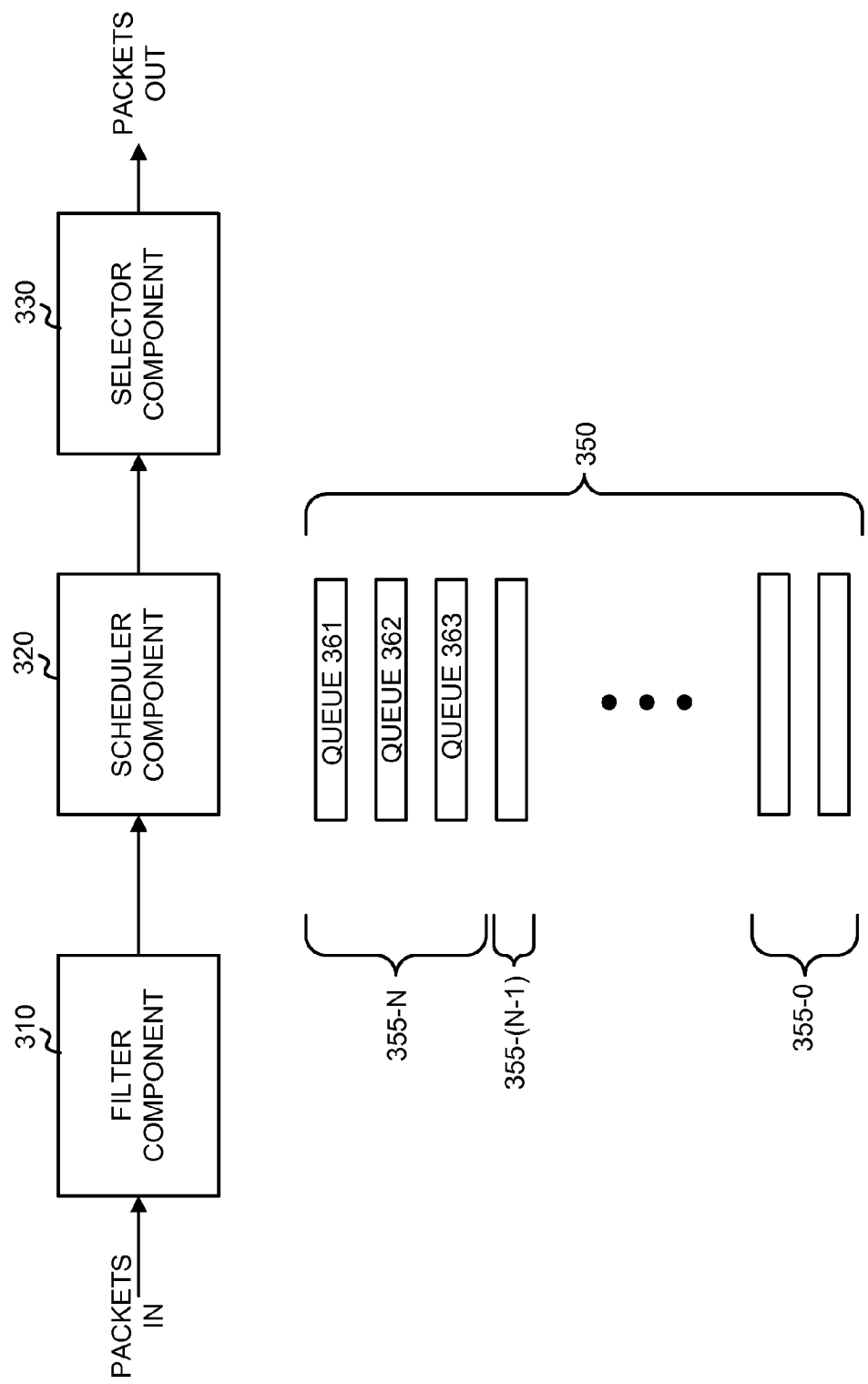
FIG. 3 is a diagram conceptually illustrating exemplary components for allocating bandwidth in a network device.

FIG. 3 is a diagram conceptually illustrating exemplary components for allocating bandwidth in a network device. In practice, the elements shown in FIG. 3 may be implemented in, for example, network device 200, such as within a PFE 201 of router 137/138.

As shown in FIG. 3, network device 200 may include filter component 310, scheduler component 320, and selector component 330. In general, these components may act to determine priority for incoming packets and schedule transmission of the packets based on the determined priority relative to the priority of other packets. Although bandwidth allocation will be described as operating on packets, more generally, the techniques described herein may be applied to frames, cells, or other data units in a network device. Additionally, instead of receiving a complete packet at filter component 310, filter component 310 may only receive a header of the packet, a portion of the header of the packet, or some other data structure relating to the header of the packet. In this situation, the remainder of the packet may be stored in a different memory and then combined with an appropriate header before being transmitted.

Filter component 310 may assign a priority level to incoming packets based on, for example, a header of the packet, or other information associated with the packet, such as the output port of the packet. The priority level of a packet may define its traffic class. Other information associated with the packet may also be used to influence the priority level of the packet, such as the source of the packet or the destination of the packet.

Scheduler component 320 may assign the packets output from filter 310 to an appropriate queue. A queue may store packets (or pointers to packets) of a particular traffic class or of a particular traffic class that is destined for a particular output port. A number of exemplary queues 350 are shown in FIG. 3. Multiple queues may be implemented for a single traffic class. This is illustrated in FIG. 3 by sets of queues 355-0 through 355-N, where each of the N+1 sets may include zero or more queues. For example, priority class 355-N (i.e., the queues having priority level N, the highest priority level) is shown as including three distinct queues, labeled as queues 361 through 363. Multiple queues may correspond to a single priority class. In situations in which multiple queues exist for a single traffic class, each of the different queues, such as queues 361, 362, and 363, may correspond to a different physical link or a different output port in a PFE 201.

In practice, a single queue may be dedicated to a particular packet flow, stream, or other logical grouping of traffic. Each of queues 350 may be implemented as first-in-first-out (FIFO) queues.

Additionally, each queue within a traffic class set 355 may be associated with a weight. The weights assigned to the queues may used to implement weighted bandwidth allocation. For example, each weight may represent the portion of the available bandwidth that is to be allocated to the queue.

Scheduler component 320 may assign the weights to the queues. Scheduler component 320 may periodically or intermittently update the weights for queues 350. In one implementation, the weights may be assigned from automatically generated configuration templates based on the selection of a relatively few intuitive parameters by an administrator.

Selector component 330 may determine which queues to serve (i.e., the queue from which to dequeue a packet) based on the CoS configurations for queues 350. For example, the total weight of a link may be apportioned to the queues associated with the link in proportion to their weights.

Operation of Network Device

Figure 4:
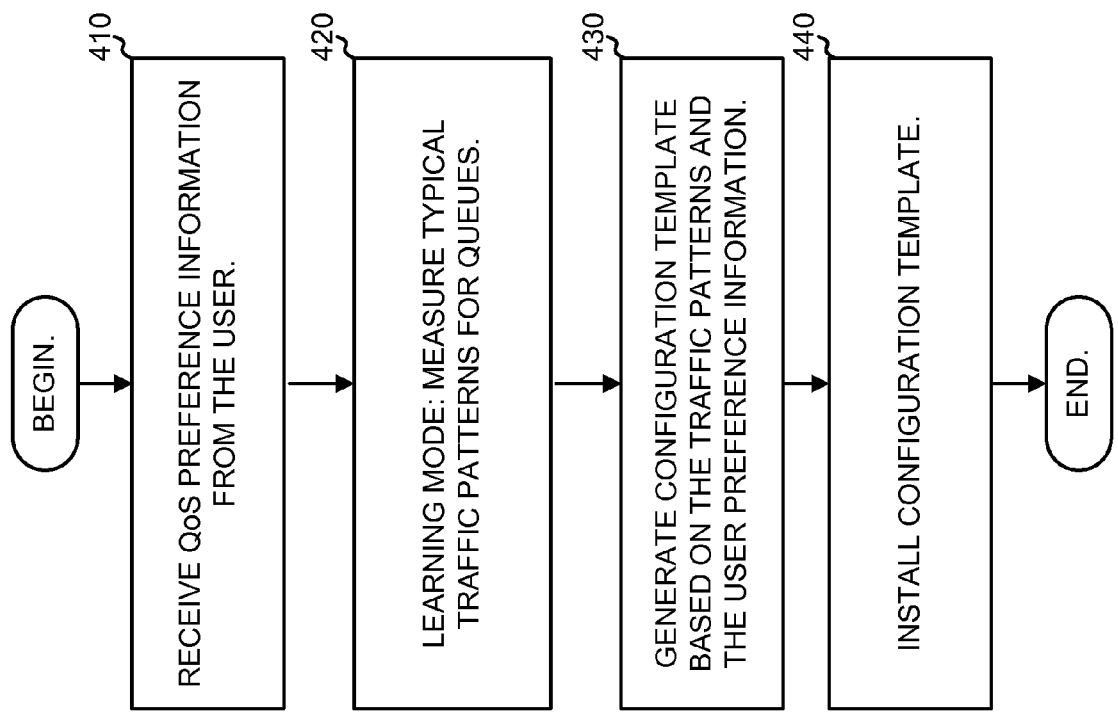
FIG. 4 is flow chart illustrating exemplary operations that may be performed by network a device in configuring bandwidth allocation within the network device.

FIG. 4 is flow chart illustrating exemplary operations that may be performed by network device 200 in configuring bandwidth allocation within the network device.

Network device 200 may receive QoS preference information from a user, such as a technician or administrator (block 410). The preference information may define directly observable "user experience" parameters that generally relate to relatively intuitive parameters regarding quality of service. The parameters may include, for instance, latency, drop rate, and traffic priority levels. Both of these parameters may be directly observable by a user. For example, for a voice session, an increase in latency may result in a noticeable delay between the speakers and an increase in the drop rate may result in a noticeable degradation in the fidelity of the audio.

The QoS preference information may be received by network device 200 in a number of ways. For instance, the user may remotely connect to network device 200, through network 140, via a web (HTTP) session or an ftp session. Through these sessions, the user may for example, interact with a graphical interface or upload a configuration file. Alternatively, the user may provide the configuration information to network device 200 through an interface provided locally by device 200 (e.g., an interface defined by a keyboard, mouse, and display).

Figure 5:
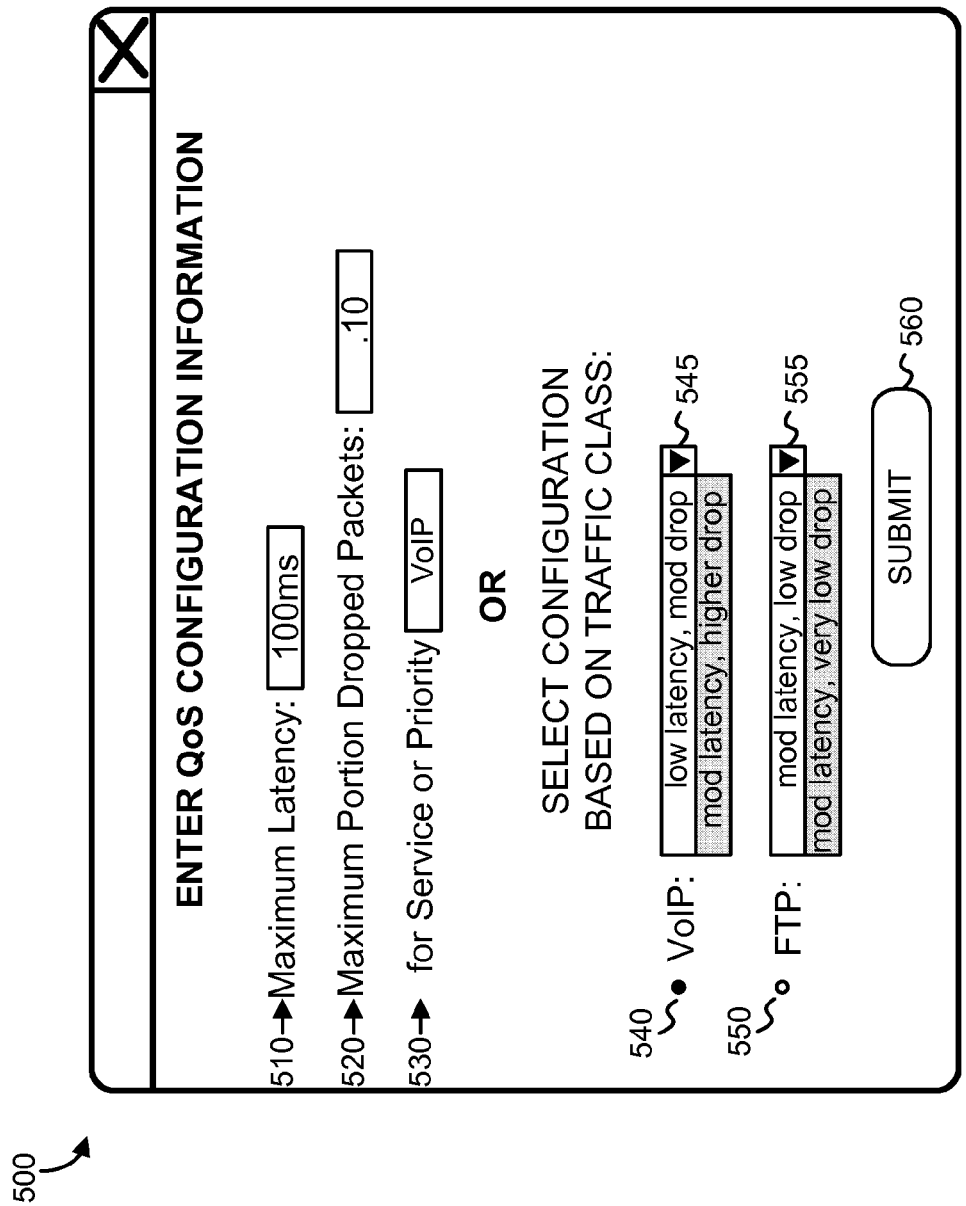
FIG. 5 is a diagram of one exemplary graphical user interface that may be provided by a network device to a user to obtain QoS configuration information.

FIG. 5 is a diagram of one exemplary graphical user interface (GUI) 500 that may be provided by network device 200 to the user to obtain the QoS configuration information in block 510. GUI 500 may be an interface provided through a web browser running at, for example, client 125 and connected to network device 200.

In this example, GUI 500 provides a number of fields that the user can use to enter QoS configuration information. "Maximum latency" field 510 and "Maximum Portion Dropped Packets" field 520 may be used to directly enter values that define the maximum acceptable latency and the maximum acceptable packet drop rate for a particular service or priority class of the traffic. These values may be applied to a particular service (e.g., Voice over IP (VoIP) or file transfer protocol (FTP)) or priority class, which may be entered in "service" field 530. In this example, the user has entered a maximum latency of 100 milliseconds (ms), a maximum drop rate of 10%, and that these two parameters should be applied to VoIP traffic. In other words, the user desires that VoIP traffic have a latency of 100 ms or less and that no more than 10% of the VoIP packets be dropped.

Alternatively, in some implementations, instead of entering the configuration as "hard" threshold values, the user may be given the option of selecting from pre-defined "fuzzy" thresholds. As shown in GUI 500, for example, the user may select various services, such as VoIP 540 and/or FTP 550, to configure. For each service, a drop-down list of selections, such as VoIP selections 545 and FTP selections 555, may be presented. The drop-down selections may include selection choices that allow the user to generally configure the QoS parameters by selecting from a set of pre-defined choices that typically apply to the service. For example, for VoIP traffic, low latency is typically important, as users tend to adversely notice high latency during a voice conversation. Dropped packets may not be as important to perceived quality of service, however. VoIP drop-down selection list 545 may present choices such as "low latency, mod drop" (low latency, moderate packet drop) and "mod latency, higher drop" (moderate latency, higher packet drop). Each selection may correspond to predetermined values for latency and allowable packet drops. FTP drop-down selection list 555 may similarly present a number of pre-configured choices.

After selecting appropriate configuration information, the user may submit the information to network device 200 via "submit" button 560.

Although latency and packet drop rates were illustrated as two examples of user entered preference information in FIG. 5, it can be appreciated that other types of user preference information may also be configured by the user. Further, in some implementations, it may be possible that the user may choose to not enter any preference information and may instead select an option through which network device 200 may automatically select preference information based on, for example, a default configuration for the various services.

Referring back to FIG. 4, network device 200 may next, in a learning mode, measure typical traffic patterns for queues 350 (block 420). The typical traffic patterns may be based on a monitoring of queues 350 for a certain time period, such as a few seconds, minutes, or longer. During the learning mode, parameters relating to usage of the queues may be measured.

Figure 6:
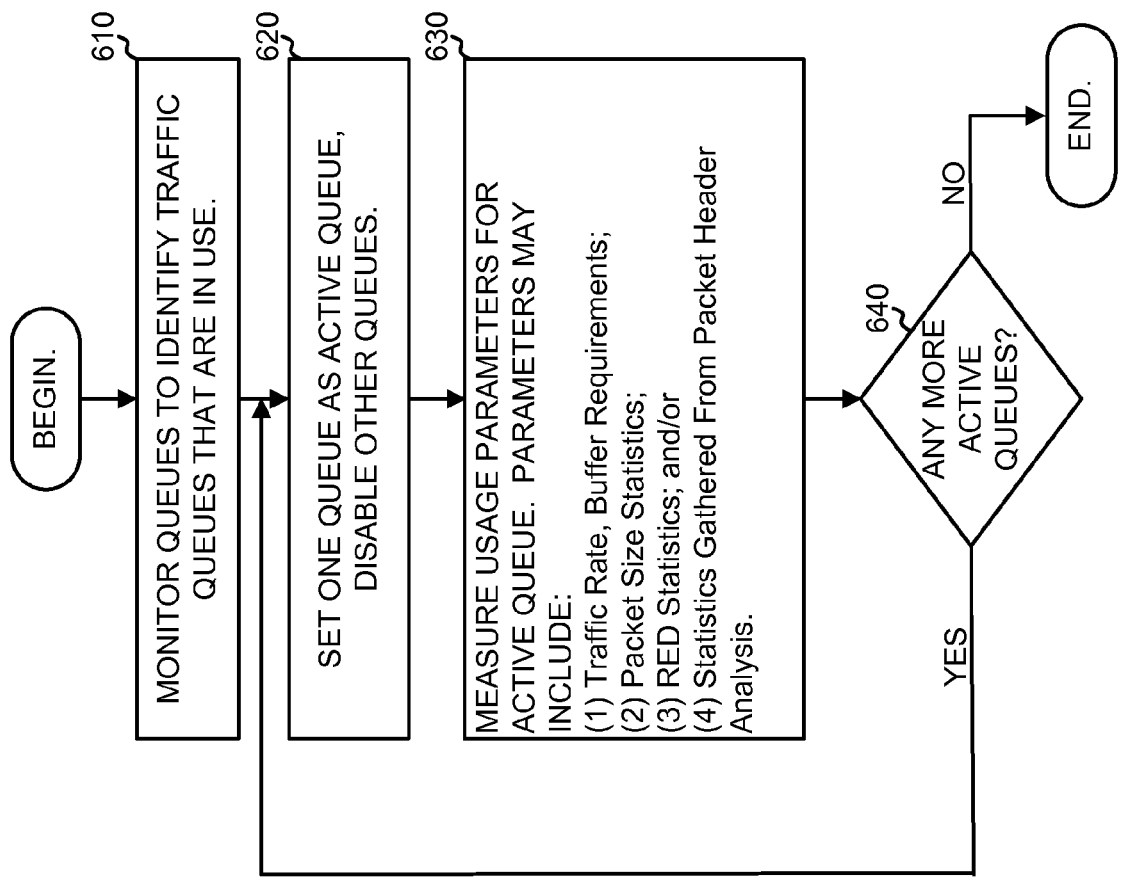
FIG. 6 is a flow chart illustrating exemplary operations that may be performed during a learning mode in one exemplary implementation.

FIG. 6 is a flow chart illustrating exemplary operations that may be performed during the learning mode (block 420) in one exemplary implementation. Network device 200 may monitor queues 355 during operation of network device 200 to determine which queues are in use (block 610). In some situations, some of queues 355 may be enabled but may not actually receive traffic. Network device 200 may identify those of queues 355 that are being used.

From the identified active queues (block 610), network device 200 may set one queue as the active queue and disable the other queues (block 620). By setting a single queue as an active queue, network device 200 may isolate the activity of that queue. Network device 200 may monitor the active queue for a certain interval, such as a few seconds or few minutes, and measure usage parameters relating to that active queue (block 630). A number of parameters may be measured. As shown in block 630, these parameters may include: a traffic rate and/or buffer requirements at the queue; packet size statistics, such as average size, minimum size, maximum size, and the distribution of the sizes; statistics relating to the random early discard (RED) of packets; and statistics relating to information in packet headers. The statistics relating to information in the packet headers, in particular, may be used to determine the CoS for the traffic and potentially to profile the traffic to determine the service(s) that the traffic is implementing (e.g., VoIP, FTP, etc.). The packet headers may be particularly analyzed to recognize the application type, such as by parsing and looking up L3, L4, and L7 headres. Network device 200 may, for example, include the ability to sample packet headers and analyze the sampled headers to determine the service type.

In one implementation, the traffic rate/buffer requirements for each queue may be calculated by initially setting a target rate limit on the active queue at 100% of the port corresponding to the active queue or at a user-defined bandwidth limit (if configured) for the active queue. Network device 200 may monitor the queue for drops. Network device 200 may then reduce the rate limit and again monitor the queue for drops. This rate limit at which drops begin to happen may be indicative of the peak bandwidth requirement on this queue. Network device 200 may continue to repeat this procedure using gradually lower rate limits. When a certain portion (e.g., X % drops) of the packets through the queue begin to be dropped, network device 200 may assume the corresponding rate limit of the queue is the average traffic rate of the queue. The minimum and/or peak buffer occupancy over the range between the drop of one packet and X % may also be measured. The number for X % may be set, for example, based on a user acceptable drop level or, if no user acceptable drop level is provided, a default drop level.

RED is a known active queue management algorithm that drops packets based on statistical probabilities. Statistics relating to RED may include thresholds relating to the minimum and maximum queue threshold as well as the average number or rate of dropped packets.

Blocks 620 and 630 may be repeated for each active queue (block 640). In one implementation, the queues set as active queues in block 620 may be set in an order based on the priority of the queues. For example, usage parameters may first be measured for the highest priority active queue, followed by usage parameters for the next highest priority active queue, etc. In this manner, usage parameters may be determined individually for each queue.

Referring back to FIG. 4, a configuration template may be generated or retrieved based on the measured usage parameters and the user preference information (block 430). As used herein, a "configuration template" may refer to parameters that determine the configuration and relative priority of queues 350. The configuration template may, for instance, include the weights assigned to each of queues 350 by scheduler component 320 and the buffer size of queues 350. A configuration template may be generated on a port-basis in network device 200.

As an example of generating the configuration template based on the measured usage parameters and the user preference information, network device 200 may determine, based on the traffic rate and the statistics gathered from the packet header analysis, the queue weights to ensure that higher priority queues have proportionally lower drop probabilities. Additionally, based on the traffic rate and packet size statistics, network device 200 may determine the queue buffer sizes so that each active queue can buffer a minimum number of packets. More particularly, buffer sizes for the queues may be set in proportion to traffic distribution and taking into account latency and burst handling requirements to ensure that higher priority queues are assigned a higher share of the available buffer space. Additionally, network device may ensure that each active queue is associated with a buffer size that is capable of sending a minimum number of packets of an average packet size and has the ability to buffer a packet of the maximum expected size.

Network device 200 may also take into account the desired maximum latency and maximum portion of dropped packets (drop rate) when setting the queue weights and buffer sizes. For instance, based on the measured usage parameters, network device 200 may simulate or estimate the maximum latency and the drop rate to obtain a configuration template that is likely to satisfy the user preference information.

As another example of generating a configuration template based on the measured usage parameters, consider the case in which some of queues 350 are determined to be queues that service VoIP traffic while other ones of queues 350 service data traffic. Network device 200 may generate a configuration template in which the VoIP queues are given strict priority over the data queues and in which the data queues are weighted based on the average traffic rate or based on the average traffic weight multiplied by a scaling factor determined based on queue priority.

In another possible implementation of block 430, network device 200 may store a number of pre-defined configuration templates. In block 430, network device 200 may match the user preference information measured usage parameters to the pre-defined configuration templates to obtain the configuration template that best matches the usage parameters. In one implementation, the pre-defined templates may be associated with different network services, such as a first template designed for VoIP traffic and a second template designed for FTP traffic. The best match may be particularly performed by matching the pre-defined templates against the most active of the active queues. If none of the pre-defined templates matches the most active of the active queues, the next most active queue may be matched to the pre-defined templates. This process may be repeated until a template is found that matches an active queue. For example, if the most active queue is determined to be a queue that handles VoIP traffic, a template pre-defined for VoIP traffic may be used. If there are no templates pre-defined for voice traffic, the next most active queue may be matched.

Network device 200 may install the generated (or selected) configuration template (block 440). For instance, the weights and buffer sizes associated with each queue may be used by scheduler component 320 to setup queues 350. In some implementations, the generated configuration template may be automatically installed. Alternatively, network device 200 may be configured so that manual approval of the new configuration template by the administrator may be required before it is installed.

The operations shown in FIG. 4 may be repeated intermittently, periodically, or at the specific request of a user. For example, the operations shown in FIG. 4 may be performed whenever a significant change in traffic patterns is detected by network device 200, such as a surge in traffic volume or a change in link availability (e.g., a link failure).

As described above, network device 200 may automatically generate or select templates for configuring the QoS for network device 200. The templates may be generated/selected based on user preference information that is input as relatively intuitive user experience parameters such as latency and acceptable loss rather than system parameters such as buffer and scheduler configurations. The active template may be re-generated or selected based on real-time traffic conditions.

CONCLUSION

The foregoing description of implementations provides an illustration, but is not intended to be exhaustive or to limit the implementations to the precise form disclosed. Modifications and variations are possible in light of the above teachings or may be acquired from practice of the teachings.

In addition, while a series of blocks has been described with regard to the process illustrated in FIGS. 4 and 6, the order of the blocks may be modified in other implementations. Further, non-dependent blocks may be performed in parallel.

Also, certain aspects have been described as being implemented as "logic" or a "component" that performs one or more functions. This logic or component may include hardware, such as a processor, microprocessor, an ASIC, or a FPGA, or a combination of hardware and software, such as a processor/microprocessor executing instructions stored in a computer-readable medium.

It will be apparent that aspects described herein may be implemented in many different forms of software, firmware, and hardware in the implementations illustrated in the figures. The actual software code or specialized control hardware used to implement aspects does not limit the embodiments. Thus, the operation and behavior of the aspects were described without reference to the specific software code—it being understood that software and control hardware can be designed to implement the aspects based on the description herein.

The term "may" is used throughout this application and is intended to be interpreted, for example, as "having the potential to," "configured to," or "being able," and not in a mandatory sense (e.g., as "must"). The terms "a," "an," and "the" are intended to be interpreted to include one or more items. ere only one item is intended, the term "one" or similar language is used. Further, the phrase "based on" is intended to be interpreted as "based, at least in part, on," unless explicitly stated otherwise. The term "and/or" is intended to be interpreted to include any and all combinations of one or more of the associated list items.

Even though particular combination of features are recited in the claims and/or disclosed in the specification, these combinations are not intended to limit the disclosure of the invention. In fact, many of these features may be combined in ways not specifically recited in the claims and/or disclosed in the specification.

No element, block, or instruction used in the present application should be construed as critical or essential to the implementations described herein unless explicitly described as such.

What is claimed:

1. A method comprising:
   setting, by a device, a first queue, of a plurality of queues, as an active queue;
   calculating, by the device, an average traffic rate through the first queue,
      the calculating including:
         setting the first queue to a first rate limit;
         measuring a drop rate of the first queue based on the first rate limit;
         lowering the first rate limit;
         measuring the drop rate resulting from lowering the first rate limit; and
         using the drop rate resulting from lowering the first rate limit when calculating the average traffic rate;
   measuring, by the device and using the average traffic rate, traffic patterns through the device;
   configuring, by the device, one or more policies based on the measured traffic patterns and information relating to network traffic passing through the device; and
   routing, by the device, traffic through the device based on the configured one or more policies.

2. The method of claim 1, where, when setting the first queue as the active queue, the method further comprises:
   disabling one or more second queues of the plurality of queues.

3. The method of claim 1, where the first rate limit corresponds to a bandwidth limit associated with the first queue.

4. The method of claim 1, where the average traffic rate corresponds to a rate limit associated with the first queue.

5. The method of claim 1, further comprising:
   setting a second queue, of the plurality of queues, as the active queue;
   calculating an average traffic rate through the second queue;
   setting a third queue, of the plurality of queues, as the active queue; and
   calculating an average traffic rate through the third queue.

6. The method of claim 5, further comprising:
   assigning a first queue weight to the first queue;
   assigning a second queue weight to the second queue; and
   assigning a third queue weight to the third queue.

7. The method of claim 6, where, when assigning the first queue weight, the second queue weight, and the third queue weight, the method further includes:
   assigning the first queue weight, the second queue weight, and the third queue weight such that a higher priority queue, associated with one of the first queue, the second queue, or the third queue, has a lower drop probability than others of the first queue, the second queue, or the third queue.

8. A device comprising:
   a processor to:
      set a first queue, of a plurality of queues, as an active queue;
      calculate an average traffic rate through the first queue,
         when calculating the average traffic rate through the first queue, the processor is further to:
            set the first queue to a first rate limit;
            measure a drop rate of the first queue based on the first rate limit;
            lower the first rate limit;
            measure the drop rate resulting from lowering the first rate limit; and
            use the drop rate resulting from lowering the first rate limit when calculating the average traffic rate;
      measure, using the average traffic rate, traffic patterns through the device;
      configure one or more policies based on the measured traffic patterns and information relating to network traffic passing through the device; and
      route traffic through the device based on the configured one or more policies.

9. The device of claim 8, where, when setting the first queue as the active queue, the processor is further to:
   disable one or more second queues of the plurality of queues.

10. The device of claim 8, where the first rate limit corresponds to a bandwidth limit associated with the first queue.

11. The device of claim 8, where the average traffic rate corresponds to a rate limit associated with the first queue.

12. The device of claim 8, where the processor is further to:
   set a second queue, of the plurality of queues, as the active queue;
   calculate an average traffic rate through the second queue;
   set a third queue, of the plurality of queues, as the active queue; and
   calculate an average traffic rate through the third queue.

13. The device of claim 12, where the processor is further to:
   assign a first queue weight to the first queue;
   assign a second queue weight to the second queue; and
   assign a third queue weight to the third queue.

14. The device of claim 13, where, when assigning the first queue weight, the second queue weight, and the third queue weight, the processor is further to:
   assign the first queue weight, the second queue weight, and the third queue weight such that a higher priority queue, associated with one of the first queue, the second queue, or the third queue, has a lower drop probability than others of the first queue, the second queue, or the third queue.

15. A non-transitory computer-readable medium storing instructions, the instructions comprising:
one or more instructions which, when executed by at least one processor of a device, cause the at least one processor to:
set a first queue, of a plurality of queues, as an active queue;
calculate an average traffic rate through the first queue, the one or more instructions to calculate the average traffic rate through the first queue including:
one or more instructions to set the first queue to a first rate limit;
one or more instructions to measure a drop rate of the first queue based on the first rate limit;
one or more instructions to lower the first rate limit;
one or more instructions to measure the drop rate resulting from lowering the first rate limit; and
one or more instructions to use the drop rate resulting from lowering the first rate limit when calculating the average traffic rate;
measure, using the average traffic rate, traffic patterns through the device;
configure one or more policies based on the measured traffic patterns and information relating to network traffic passing through the device; and
route traffic through the device based on the configured one or more policies.

16. The non-transitory computer-readable medium of claim 15, where the instructions further include:
one or more instructions which, when executed by the at least one processor, cause the at least one processor to disable one or more second queues of the plurality of queues.

17. The non-transitory computer-readable medium of claim 15, where
the first rate limit corresponds to a bandwidth limit associated with the first queue, and
the average traffic rate corresponds to a rate limit associated with the first queue.

18. The non-transitory computer-readable medium of claim 15, where the instructions further include:
one or more instructions which, when executed by the at least one processor, cause the at least one processor to:
set a second queue, of the plurality of queues, as the active queue;
calculate an average traffic rate through the second queue;
set a third queue, of the plurality of queues, as the active queue; and
calculate an average traffic rate through the third queue.

19. The non-transitory computer-readable medium of claim 18, where the instructions further include:
one or more instructions which, when executed by the at least one processor, cause the at least one processor to:
assign a first queue weight to the first queue;
assign a second queue weight to the second queue; and
assign a third queue weight to the third queue.

20. The non-transitory computer-readable medium of claim 19, where the instructions further include:
one or more instructions which, when executed by the at least one processor, cause the at least one processor to:
assign the first queue weight, the second queue weight, and the third queue weight such that a higher priority queue, associated with one of the first queue, the second queue, or the third queue, has a lower drop probability than others of the first queue, the second queue, or the third queue.

* * * * *